United States Patent
Henry

(10) Patent No.: US 8,424,844 B2
(45) Date of Patent: Apr. 23, 2013

(54) APPARATUS AND METHOD FOR ADJUSTING THE PULLING-MEANS TENSION IN A PULLING MEANS-DRIVE, AND MICROSCOPE HAVING A PULLING-MEANS DRIVE

(75) Inventor: Didier Henry, Lustenau (AT)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 757 days.

(21) Appl. No.: 12/372,018

(22) Filed: Feb. 17, 2009

(65) Prior Publication Data

US 2009/0268282 A1    Oct. 29, 2009

(30) Foreign Application Priority Data

Feb. 28, 2008  (DE) .......................... 10 2008 000 434

(51) Int. Cl.
- *B66F 5/04*   (2006.01)
- *B62B 3/06*   (2006.01)
- *G02B 21/00*  (2006.01)
- *G02B 21/26*  (2006.01)
- *G02B 15/14*  (2006.01)
- *G01K 5/08*   (2006.01)
- *G01K 5/10*   (2006.01)

(52) U.S. Cl.
USPC ............ 254/2 B; 359/380; 359/393; 359/700; 250/441.11

(58) Field of Classification Search ................. 254/2 B; 359/380, 393, 376, 700, 701; 250/441.11
See application file for complete search history.

(56) References Cited

U.S. PATENT DOCUMENTS

| | | | | |
|---|---|---|---|---|
| 3,405,991 A | * | 10/1968 | Seedhouse | 359/376 |
| 3,510,202 A | * | 5/1970 | Boughton | 359/700 |
| 4,622,024 A | * | 11/1986 | Lawson | 474/102 |
| 4,650,296 A | * | 3/1987 | Tsuchiya | 359/380 |
| 5,010,636 A | | 4/1991 | Hall et al. | |
| 5,675,442 A | * | 10/1997 | Parks | 359/701 |
| 6,369,940 B1 | * | 4/2002 | Nishida et al. | 359/393 |
| 7,531,816 B2 | * | 5/2009 | Saito et al. | 250/441.11 |
| 8,115,832 B2 | * | 2/2012 | Luber | 348/240.3 |
| 2007/0029504 A1 | * | 2/2007 | Saito et al. | 250/441.11 |

FOREIGN PATENT DOCUMENTS

| | | |
|---|---|---|
| DE | 7207038 | 5/1972 |
| DE | 226091 | 8/1985 |
| DE | 265942 | 3/1989 |
| DE | 3821369 | 1/1990 |
| DE | 10045144 | 3/2002 |

\* cited by examiner

*Primary Examiner* — Lee D Wilson
*Assistant Examiner* — Alvin Grant
(74) *Attorney, Agent, or Firm* — Leydig, Voit & Mayer, Ltd.

(57) ABSTRACT

An apparatus for adjusting a tension of a pulling device in a pulling-device drive includes a body and a lever arm. The pulling-device drive includes first and second shafts and the pulling device loops around the first and second shafts. The body includes a receptacle adapted to interact with the first shaft and a support point adapted to rotatably dispose the body about an axis of rotation. The lever arm extends from the body so that a spacing between the first and second shafts is modifiable by action of a force on the lever arm.

4 Claims, 7 Drawing Sheets

APPARATUS AND METHOD FOR ADJUSTING THE PULLING-MEANS TENSION IN A PULLING MEANS-DRIVE, AND MICROSCOPE HAVING A PULLING-MEANS DRIVE

CROSS-REFERENCE TO RELATED APPLICATION

Priority is claimed to German Patent Application No. DE 10 2008 000 434.0, filed Feb. 28, 2008, the entire disclosure of which is hereby incorporated by reference herein.

FIELD

The present invention relates to an apparatus and a method for adjusting the pulling-means tension in a pulling-means drive, and to a microscope having a pulling-means drive.

BACKGROUND

Pulling-means drives are sufficiently known in the existing art, and are used in many apparatuses, including microscopes. Pulling-means drives encompass at least a first shaft, a second shaft, and a pulling means looping around both shafts in order to transfer a torque between the shafts.

For example, a zoom microscope (macroscope or stereomicroscope) encompasses at least two lens groups that are arranged shiftably along their optical axis in order to modify the magnification of the microscope. A zoom system of this kind known from the existing art is depicted, for example, in FIG. 1. Zoom system 100 that is depicted encompasses a motor 140 for electrical displacement of lens groups 110, 120. In addition, a manual displacement of lens groups 110, 120 is likewise known. Lens groups 110, 120 are arranged on a spindle 130, the spacing of lens groups 110, 120 from one another being adjustable by way of a rotation of spindle 130. Spindle 130 in turn is connected via a pulling means (belt) 150 to drive shaft 141 of motor 140. More-detailed explanations of FIG. 1 may be found below in the description of the Figures. In such pulling-means drives, zero-backlash force transfer with no substantial force acting on the motor shaft is aimed for. The pulling-means tension must be adjusted in defined fashion for that purpose.

In the existing art, the pulling-means tension is usually adjusted in several steps. Firstly a first adjustment is performed, the quality of which depends critically on the experience of the user making the adjustment. The tension that has been set is then determined, for example via the resonant frequency of the pulling means. The user must then, in a following step, increase or decrease the tension depending on the measurement result, and then measure the tension again. The total time expenditure depends significantly on the user's experience and precision, and also cannot be arbitrarily decreased given the measurement steps necessary; this makes the method complex and costly.

FIG. 2 depicts a further known possibility for adjusting the pulling-means tension, in which a tension element (tension pulley 200) acts resiliently on pulling means 150. More-detailed explanations of FIG. 2 may be found below in the description of the Figures. A disadvantage of this existing art is that an additional element that generates costs and requires installation space must be provided, which element moreover exerts forces on the pulling means and thus increases wear.

In FIG. 1, a prior art zoom apparatus for a microscope is schematically depicted in a side view and labeled 100 in its entirety. Zoom apparatus 100 encompasses a first lens group 110 and a second lens group 120, which are arranged movably relative to one another along their optical axis. Provided for movement of the lens groups 110 and 120 with respect to one another is a spindle 130 that comprises helically extending cutouts 131 and 132. Lens group 110 is in interaction with cutout 131; lens group 120 is in interaction with cutout 132. A displacement of lens groups 110 and 120 relative to one another can thus be achieved by a rotation of spindle 130 about its rotation axis A.

In the depiction shown, spindle 130 is driven by an electric motor 140 by means of a pulling means embodied as belt 150. For that purpose, a drive axle 141 of motor 140 executes a rotation about its rotation axis B.

FIG. 2 depicts, from above, a prior art zoom apparatus 100 (for example, according to FIG. 1). Motor 140 is installable inside the microscope by means of arrangement means 142, 143. A spring-driven tension pulley 200 is provided in order to define a pulling-means tension on belt 150. A disadvantage of the arrangement depicted is that an additional component is used, the physical and geometric parameters of which must be adjusted in defined fashion in order to achieve the desired pulling-means tension. An increased space requirement also exists.

In another known method, the pulling-means tension is initially adjusted, for example, by means of a spring. The motor is then manually immobilized (which already influences the tension previously set) and bolted down. Experience shows that this causes tilting and thus a change, usually an increase, in the spacing of axes A, B, with the result that the pulling-means tension can be impermissibly increased. This results in loading of the bearings and thus in increased wear.

The known methods furthermore have the disadvantage that the tolerances of the spring, of the belt length, and/or of the suspension points negatively affect the accuracy of the pulling-means tension.

SUMMARY

In an embodiment, the present invention provides an apparatus for adjusting the tension of a pulling device in a pulling-device drive. The pulling-device drive includes first and second shafts and the pulling device loops around the first and second shafts. The apparatus includes a body having a receptacle and a support point. The receptacle is adapted to interact with the first shaft and the support point is adapted to rotatably dispose the body about an axis of rotation. The apparatus further includes a lever arm extending from the body. A spacing between the first and second shafts is modifiable by action of a force on the lever arm.

BRIEF DESCRIPTION OF THE DRAWINGS

FIG. 3b is a side view of the arrangement of FIG. 3a;

FIG. 4b is a side view of the arrangement of FIG. 4a; and

DETAILED DESCRIPTION

Figure 1:
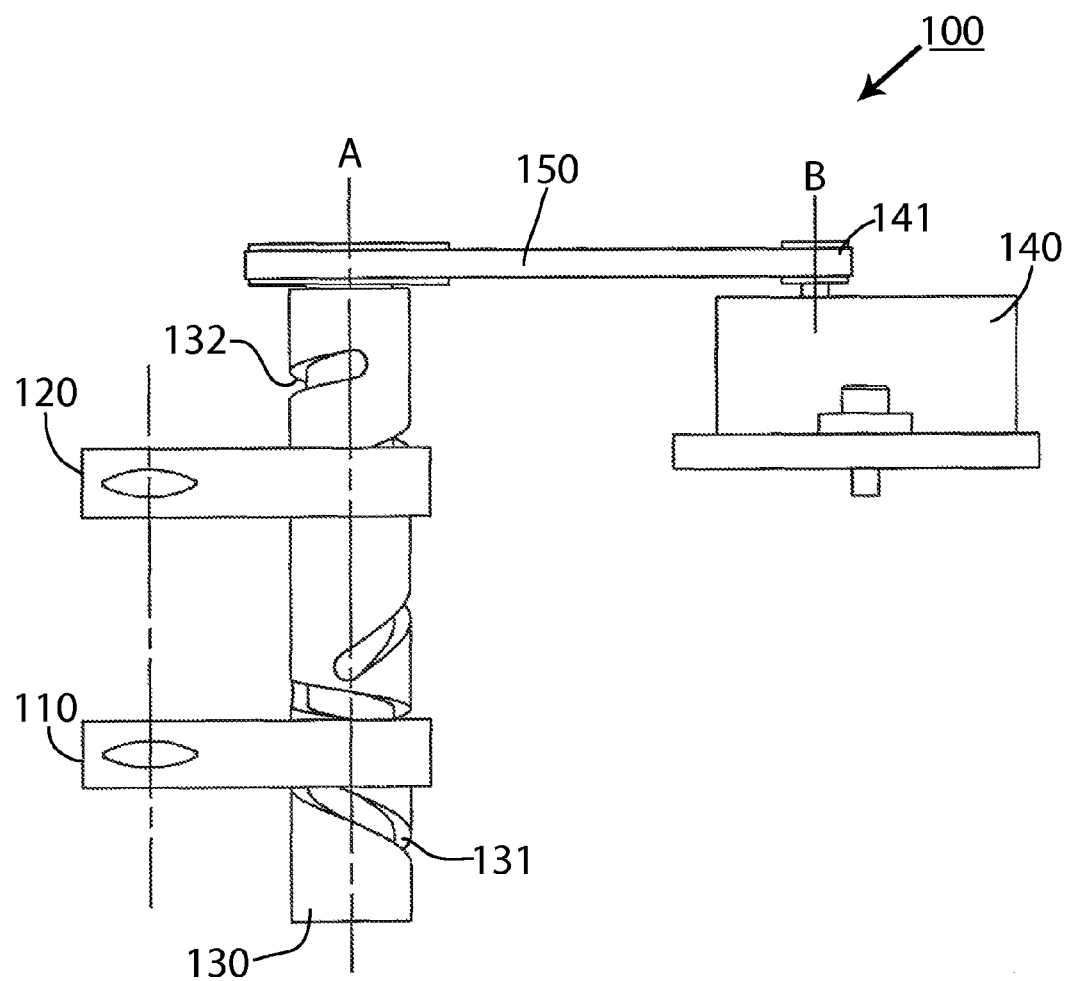
FIG. 1 shows a prior art zoom apparatus having a pulling-means drive, for a microscope.

It is an aspect of the present invention to provide an apparatus and a method that simplifies adjustment of the pulling-means tension in a pulling-means drive, e.g., in a microscope.

The apparatus according to an embodiment of the present invention comprises a body and a lever arm extending therefrom. After appropriate mounting of this apparatus on the pulling-means drive of, for example, a microscope, a rotation of the body about a rotation axis can be made available by means of a force impinging on the lever arm. The spacing between the first and the second shaft of the pulling-means drive is modifiable by rotating the body about the rotation axis, such that the adjustment of the pulling-means tension can be made available by a predetermined force impinging on the lever arm. It is to be assumed in this context, with no limitation as to generality, that the second shaft is arranged in stationary fashion, whereas the location of the first shaft is modifiable by means of the apparatus according to the present invention. Any other relative displacement of the two shafts is, however, likewise possible.

Various problems occurring in the existing art are solved with the apparatus according to an embodiment of the present invention, since the apparatus may be physically small and proves in practice to be robust and reliable. The apparatus can be arranged in the region of a shaft, so that no additional installation space is required. The apparatus can be connected indirectly or directly to a shaft, so that the latter moves along with the pulling-means drive until aligned and so that the pulling-means drive can be placed in tension-free fashion. The apparatus is capable of always setting the correct pulling-means tension regardless of the pulling-means length and further tolerances, for example the position of the engagement point on the shaft.

After adjustment of the pulling-means tension by means of the apparatus according to an embodiment of the present invention, the axles are advantageously immobilized, thus guaranteeing a permanently correct pulling-means tension. Because of its small size, the apparatus can remain without difficulty in the position mounted on the pulling-means drive even after adjustment of the pulling-means tension, and can be used again at a later point in time, for example after a motor replacement, to adjust the pulling-means tension. Alternatively, it may be removed from the pulling-means drive.

The apparatus according to an embodiment of the present invention is usable in particular in a microscope having a pulling-means drive, and allows a drive axle (first shaft), which can be driven in motorized or manual fashion, to be positioned so that only a slight pull, within a narrow tolerance range, is exerted on the drive axle. A guided motion of the drive axle or of a motor during alignment is enabled, and a force component resulting from pressure on the substrate or from tilting of the axle or of the motor is avoided, since the apparatus is positionable so that force is applied substantially in the plane of the pulling means. The apparatus is preferably advantageously flat and requires no space outside the existing pulling-means drive, since it can be accommodated inside the space occupied in any case by the pulling-means drive, for example above a motor housing that may be present.

According to an embodiment of the present invention, a torque is used to adjust a tension in a pulling-means drive.

Preferably, the lever arm is configured as an elastically deformable flexural beam. It is thereby possible to achieve reusability of the apparatus; in addition, implementation of an indicator for determining a force impinging on the lever arm is simplified.

Preferably, an indicator is provided for determining a force impinging on the lever arm. No further devices, for example measuring the pulling-means tension, are therefore required in order to set a predetermined pulling-means tension. Instead, the deflection of the flexural beam can provide information, in consideration of the known geometry of the apparatus, as to the force acting on the pulling means. The reader is referred in this connection to the description of FIG. 5.

According to an embodiment of the invention, the indicator for determining the force impinging on the lever arm or flexural beam encompasses a first marking on the lever arm or flexural beam, and a second marking on the body. With this feature it is possible to make available one or even several defined force values, e.g., as a function of deflection of the lever arm, and to indicate them to the user during impingement upon the lever arm. It is relatively easy in this fashion to set a predetermined pulling-means tension; for example, a predetermined pulling-means tension is achieved as soon as a marking on the lever arm and a marking on the body are aligned. The indicator can be embodied, e.g., in the manner of a vernier scale. When an elastic flexural beam is used, the elasticity can be selected in such a way that the indicator can be read with the naked eye.

In an embodiment, the indicator for determining the force impinging on the lever arm is embodied as an indicator for determining a deflection of the lever arm relative to the body.

Preferably, the apparatus is flat, integral, and/or configured from spring steel. The apparatus is preferably stamped out or cut out, for example by means of a laser or water jet, which makes it possible, easy and economical to manufacture of the apparatus.

Another embodiment of the present invention relates to use of the apparatus according to the present invention to adjust the pulling-means tension in a pulling-means drive in a microscope.

Preferably, the first shaft is embodied as a drive axle, e.g., of a motor, and the second shaft as a spindle, e.g., of a zoom system.

Preferably, a lever effect is applied in the context of adjustment of the pulling-means tension.

It is understood that the apparatus is not limited to use in motorized microscopes. The apparatus can also be used in so-called "coded" microscopes, such as those having manually driven zoom systems, in the context of zero-clearance transfer of spindle rotation to a rotary encoder (e.g. a magnetic sensor). The apparatus can likewise serve, in zoom microscopes in which spindle rotation is effected with a belt from the handwheel to the spindle, for positioning of an idler pulley. The apparatus can also be utilized in general in the context of pulling-means drives having chains, flat belts, toothed belts, etc.

A microscope according to an embodiment of the present invention encompasses a pulling-means drive having at least a first shaft, a second shaft, and a pulling means looping around both shafts, the microscope comprising an apparatus according to an embodiment of the present invention. One shaft can be constituted, e.g., by the drive axle of a motor. The present invention is also relevant to other rotating elements in a microscope such as, for example, sensors, such magnetic sensors for ascertaining an angular position.

It is understood that the features recited above and those yet to be explained below can be used not only in the respective combination indicated, but also in other combinations or in isolation, without leaving the context of the present invention.

The invention is schematically depicted in the drawings on the basis of an illustrative embodiment, and will be described in detail below with reference to the drawings.

Figure 2:
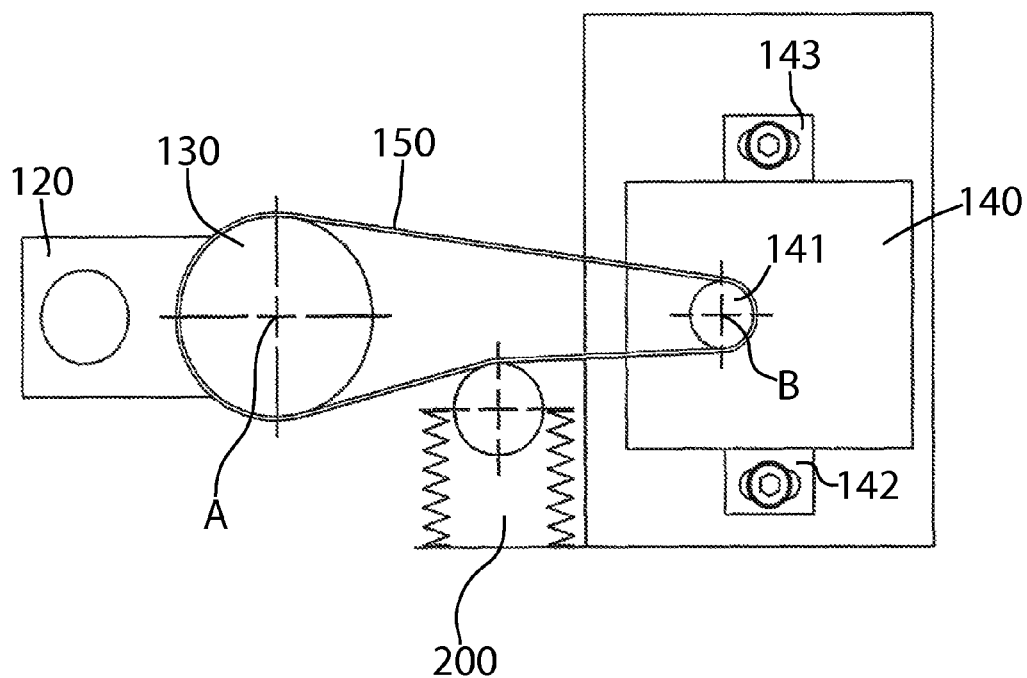
FIG. 2 shows a prior art apparatus for adjusting the pulling-means tension in the pulling-means drive of FIG. 1.
Figure 3A:
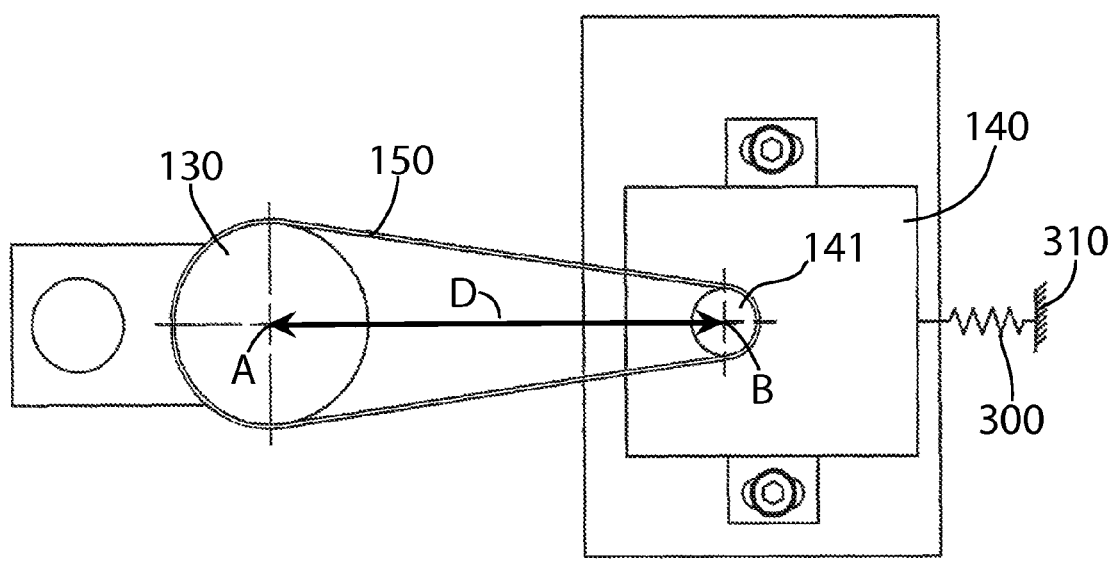
FIG. 3a shows a possible apparatus for adjusting the pulling-means tension in the pulling-means drive of FIG. 1.
Figure 3B:
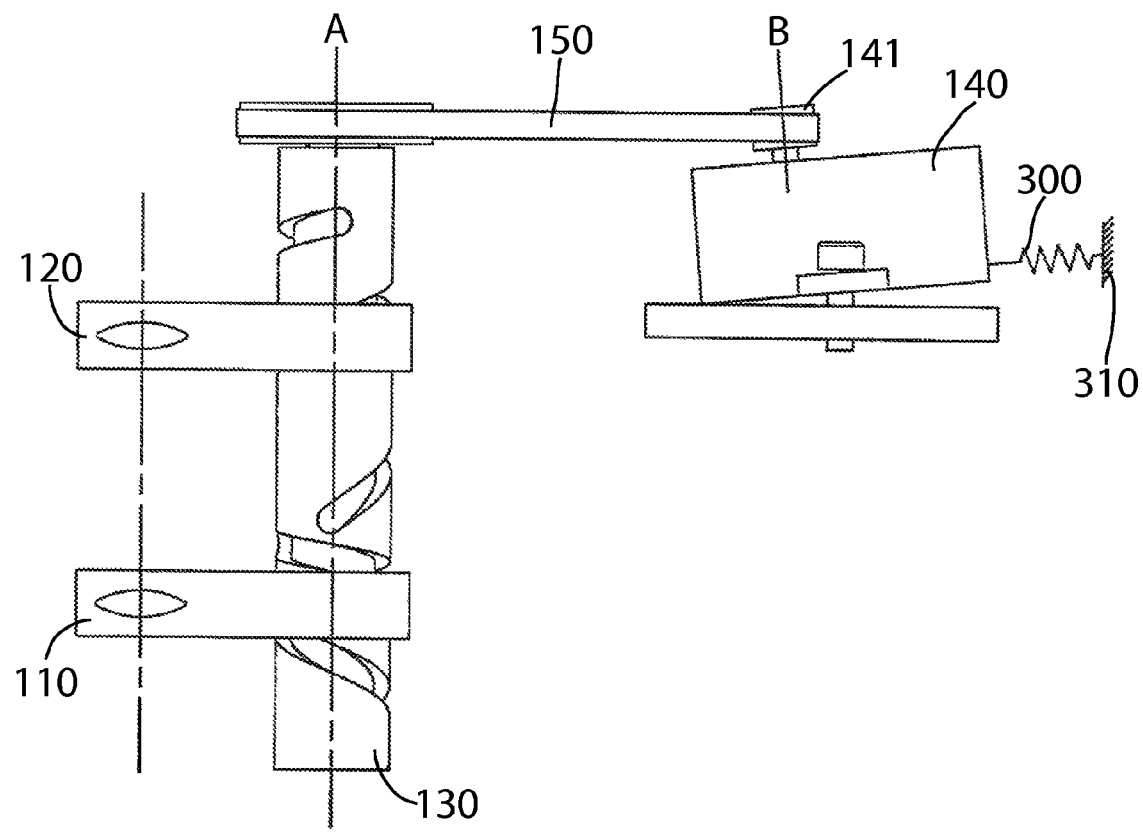

FIGS. 3a and 3b depict a possibility for adjusting the pulling-means tension in belt 150. A spring 300 is retained between motor 140 and a housing wall 310 of the microscope in order to make available a desired pulling-means tension in belt 150. In addition to the disadvantages described with reference to FIG. 2, this approach exhibits the disadvantage, depicted in FIG. 3b, that an inaccurate arrangement of spring 300, which can occur in consideration of the permissible component tolerances, can cause a tilting of motor 140 that entails, in particular, increased wear.

In this possibility for adjusting the pulling-means tension, not yet explored in the existing art and illustrated in FIGS. 3a and 3b, the pulling-means tension is adjusted by means of a change in distance D between the two shafts, a spring 300 being retained on one of the shafts (in this case shaft 141) in order to load pulling means 150 with a defined tensile force. This possibility, too, has the disadvantage that installation space for the additional elements is required, and that—depending on component precision (tolerances in the spring and its suspension point)—oblique forces can also act on pulling means 150, i.e. forces that are directed out of the plane in which the pulling means is running and result in increased wear and in tilting, as depicted e.g. in FIG. 3b.

Figure 4A:
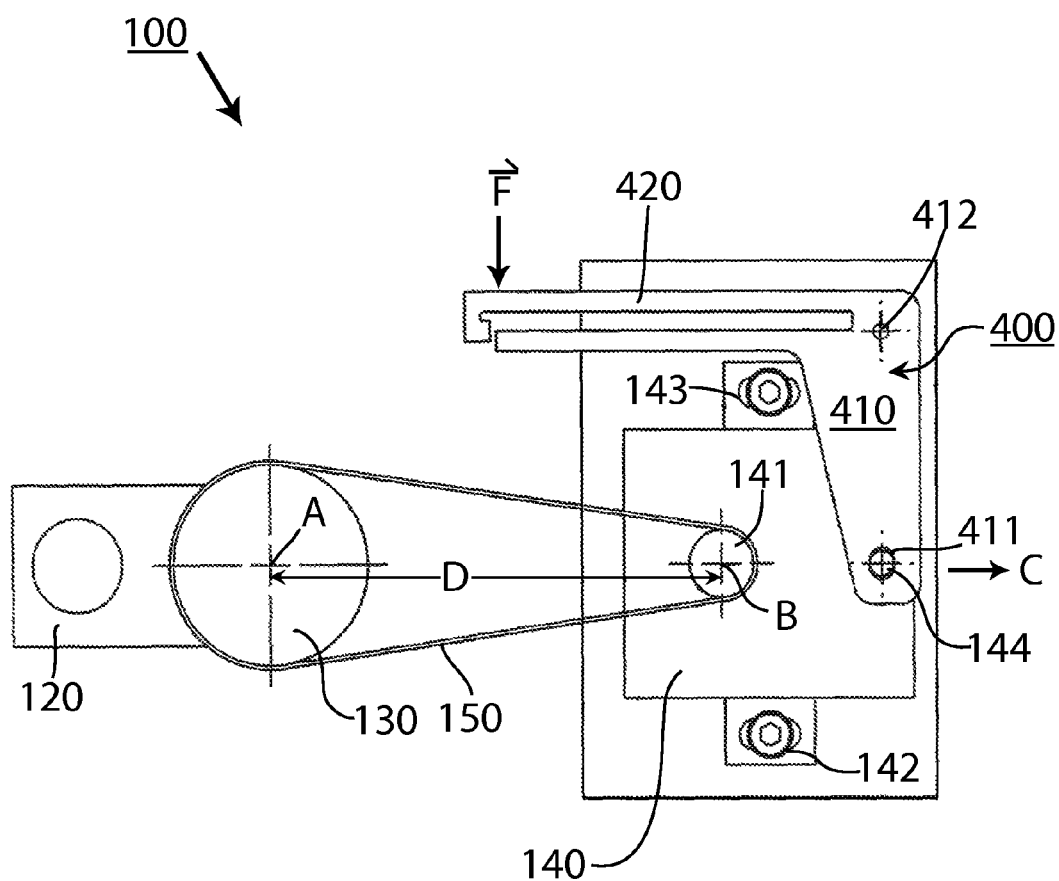
FIG. 4a shows a preferred embodiment of the apparatus according to the present invention for adjusting the pulling-means tension in the pulling-means drive of FIG. 1.
Figure 4B:
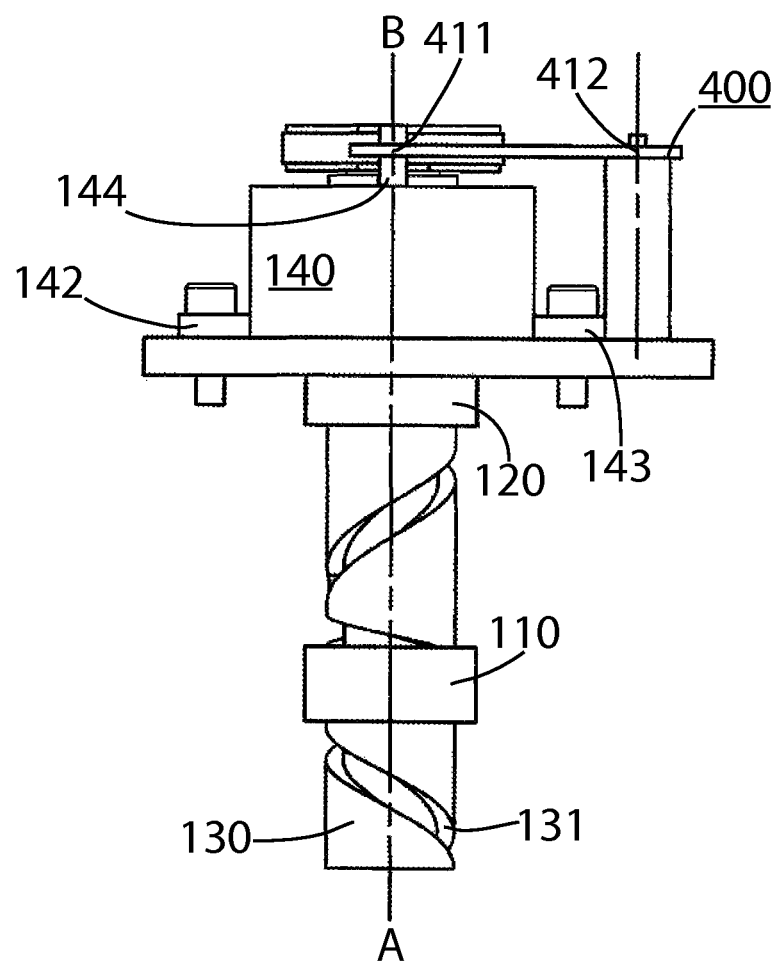
Figure 5:
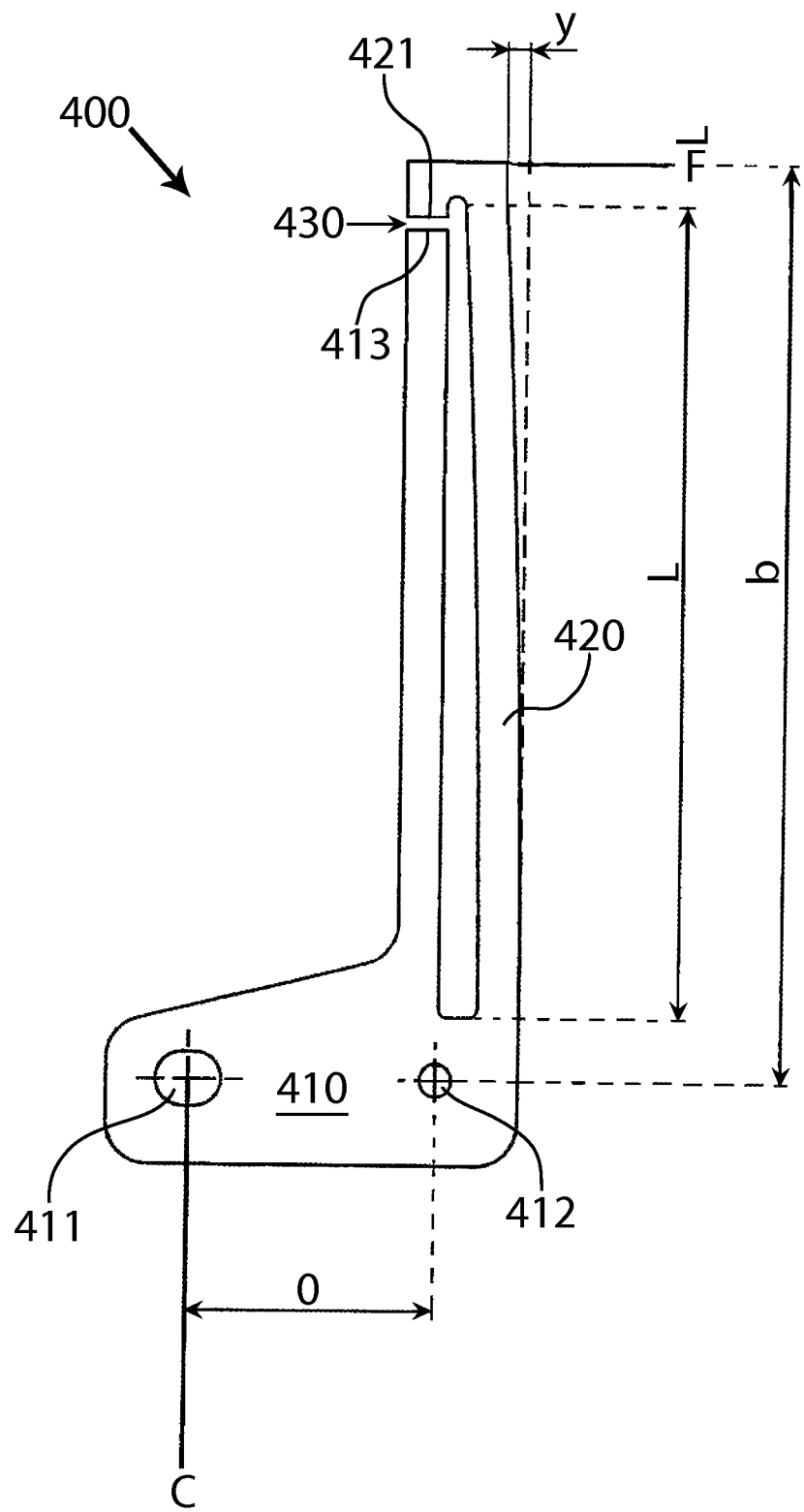
FIG. 5 shows an embodiment of an apparatus according to the present invention for adjusting the pulling-means tension.

A preferred embodiment 400 of the apparatus according to the present invention for adjusting the pulling-means tension will now be described comprehensively with reference to FIGS. 4a, 4b, and 5. As shown in FIGS. 4a and 4b, apparatus 400 according to an embodiment of the present invention is suitable for use in a microscope. It is understood, however, that other applications for apparatus 400 are of course additionally possible.

Apparatus 400 comprises a body 410 as well as a lever arm extending from body 410, which arm is embodied, e.g., as an elastically deformable flexural beam 420. Body 410 comprises a receptacle 411 and a support point 412. The support point is provided in order to make available a rotation of apparatus 400 or of body 410. Receptacle 411 is provided for interaction with a shaft of the pulling-means drive, motor 140 comprising, in the example shown, a pin 144 that engages into receptacle 411 with the result that an interaction is made available in the form of a mechanical coupling with drive axle 141.

When arrangement means 142 and 143 are not immobilized, a force F impinging on flexural beam 420 results in a rotation of body 410 about support point 412, and thus in a displacement of motor 140 in direction C. Once the desired pulling-means tension in belt 150 has been achieved, arrangement means 142, 143 are preferably immobilized in order to make the pulling-means tension, once achieved, permanently available. After immobilization, apparatus 400 either can remain in the microscope or can be removed.

The desired pulling-means tension can be predefined by way of the geometric and physical configuration of apparatus 400, as will be explained below with reference to FIG. 5.

Apparatus 400 comprises body 410, as well as flexural beam 420 extending from body 410. Apparatus 400 is preferably made from spring steel and can be produced economically, in particular as a stamped part. Support point 412, embodied as an orifice, serves as a pivot bearing. Receptacle 411, likewise embodied as an orifice, serves for interaction with a shaft of the pulling-means drive, and for that purpose can receive, for example, the shaft itself or an element that is connected to the shaft. Apparatus 400 further comprises a marking 430 that, in the example depicted, encompasses a first marking 421 on flexural beam 420 and a second marking 413 on body 410.

A rotation of body 410 about support point 412 causes approximately a linear displacement of receptacle 411, and thus of the shaft connected to the receptacle, in direction C. The linear displacement can be made available by configuring arrangement means 142, 143, for example, as elongated holes. A rotation of apparatus 400 while maintaining the original apparatus geometry, i.e. without deflection of flexural beam 420, is possible until the tension means, which loops around the shaft connected to receptacle 411, is pulled tight. Further impingement of a force F on flexural beam 420 causes a pulling-means tension ZK to be made available. The magnitude of the pulling-means tension ZK made available can be determined on the basis of the physical parameters and the geometry of apparatus 400, as will be explained below.

The spacing between receptacle 411 and support point 412 is labeled a. The spacing between the end of flexural beam 420 and support point 412 is labeled b. The length of flexural beam 420 is labeled L. Lastly, the deflection of flexural beam 420 is labeled y.

The deflection y of flexural beam 420 as a function of force F impinging on the flexural beam is defined approximately as $y = F*L^3/(3*E*I),$      i.

where E denotes the modulus of elasticity of the material of the flexural beam, and I denotes the axial geometrical moment of inertia of the cross section of the flexural beam.

Taking into account the lever effect (F*B=ZK*a), the tensile force ZK acting in direction C can thus be stated approximately as $ZK = (y*3*E*I/L^3)*(b/a).$      i.

On the basis of deflection y, a predetermined tension ZK can thus be made available. The deflection y required for this can be indicated to the user in particular by way of marking 430, for example by an alignment of first marking 421 and second marking 413.

In the context of the predefined geometry, the tensile force ZK can also be indicated as a function of the applied torque L, the magnitude of which can be calculated approximately as $L = F*b = ZK*a.$      i.

In addition to the immobilization (explained above) of the motor after the pulling-means tension is set, it is likewise possible to guide the motor, for example, in a carriage along an axis connecting the two shafts, so that no retention by means of the arrangement means is necessary in order to prevent tilting. If flexural beam 420 is, for example, retained on the housing of the microscope once the adjusting force is set, the marking or indicator 430 can serve to monitor the adjusting force ZK. If a fork light barrier is used, for example, as an indicator, monitoring can also be accomplished electronically without opening the unit. A further embodiment of the present invention uses the signal of the fork light barrier to readjust the flexural beam relative to the housing, and thereby uses the apparatus as part of a control loop to establish a constant adjusting force on the pulling means.

While the invention has been particularly shown and described with reference to preferred embodiments thereof, other embodiments of the invention are also conceivable without leaving the context of this invention. For example, instead of an apparatus 400 of substantially rectangular shape, which because of that geometry is particularly space-saving, a linear (or differently shaped) apparatus 400 can also be used.

REFERENCE CHARACTERS

100 Zoom system
110, 120 Lens group

130 Spindle, second shaft
131, 132 Cutout
140 Electric motor
141 Drive axle, first shaft
142, 143 Arrangement means
144 Pin
150 Belt, pulling means
200 Tension pulley
300 Spring
310 Housing wall
400 Apparatus
410 Body
411 Receptacle
412 Support point
413, 421 Marking
420 Flexural beam, lever arm
430 Marking
A Rotation axis
B Rotation axis
C Displacement direction
D Spacing between axes A, B
a Spacing between receptacle 411 and support point 412
b Spacing between end of flexural beam 420 and support point 412
L Length of flexural beam 420

The invention claimed is:

1. A microscope comprising:
a pulling-device drive having a first shaft and a second shaft;
a pulling device operably connected to the first shaft and the second shaft;
a body having a receptacle and a support point, the receptacle adapted to interact with the first shaft and the support point adapted to rotatably dispose the body about an axis of rotation; and
a lever arm extending from the body and including an elastically deformable flexural beam, a spacing between the first and second shafts being modifiable by action of a force on the lever arm.

2. The microscope according to claim 1, wherein the first shaft includes a drive axle and the second shaft includes a spindle.

3. The microscope according to claim 2, wherein the drive axle is operably connected to a motor.

4. The microscope according to claim 1, wherein the spindle is a spindle of a zoom system.

* * * * *